United States Patent
Ramirez (10) Patent No.: US 8,973,216 B1
(45) Date of Patent: Mar. 10, 2015

(54) GROMMET

(76) Inventor: Ralph M. Ramirez, Burbank, CA (US)

( * ) Notice: Subject to any disclaimer, the term of this patent is extended or adjusted under 35 U.S.C. 154(b) by 231 days.

(21) Appl. No.: 13/544,089

(22) Filed: Jul. 9, 2012

Related U.S. Application Data (60) Provisional application No. 61/530,251, filed on Sep. 1, 2011.

(51) Int. Cl.
*F16L 5/02* (2006.01)
*H02G 3/22* (2006.01)
*B23P 11/02* (2006.01)

(52) U.S. Cl.
USPC ............ 16/2.2; 16/2.1; 174/153 G; 248/56; 29/453; 29/450

(58) Field of Classification Search
CPC ............ F16L 5/10; F16L 5/02; H02G 3/083; H02G 3/08; B60R 16/0222
USPC ............ 16/2.1, 2.2, 108; 174/153 G; 248/56, 248/346.04; 29/446, 450, 453
See application file for complete search history.

(56) References Cited

U.S. PATENT DOCUMENTS

| | | | | |
|---|---|---|---|---|
| 2,663,895 A | * | 12/1953 | Petri | 16/2.1 |
| 2,897,533 A | * | 8/1959 | Bull et al. | 16/2.1 |
| 2,937,834 A | * | 5/1960 | Orenick et al. | 248/71 |
| 3,164,054 A | * | 1/1965 | Biesecker | 24/662 |
| 3,285,551 A | * | 11/1966 | Tschanz | 248/56 |
| 3,518,359 A | * | 6/1970 | Trimble et al. | 174/153 G |
| 3,788,655 A | * | 1/1974 | Hathaway | 277/637 |
| 3,875,843 A | * | 4/1975 | Maeda et al. | 411/548 |
| 4,137,602 A | * | 2/1979 | Klumpp, Jr. | 16/2.1 |
| 4,299,363 A | * | 11/1981 | Datschefski | 248/56 |
| 4,407,042 A | * | 10/1983 | Schramme et al. | 16/2.1 |
| 4,550,451 A | * | 11/1985 | Hubbard | 4/695 |
| 4,675,937 A | * | 6/1987 | Mitomi | 16/2.1 |
| 4,685,173 A | * | 8/1987 | Pavur | 16/2.2 |
| 4,706,999 A | * | 11/1987 | Hynes | 285/196 |
| 5,183,207 A | * | 2/1993 | Steinberg et al. | 239/526 |
| 5,287,664 A | * | 2/1994 | Schiller et al. | 52/220.1 |
| 5,488,198 A | * | 1/1996 | Kramer | 174/507 |
| 5,537,714 A | | 7/1996 | Lynch, Jr. et al. | |
| 5,626,316 A | | 5/1997 | Smigel et al. | |
| 5,627,342 A | * | 5/1997 | Kramer | 174/656 |
| 5,653,147 A | * | 8/1997 | Kelley et al. | 74/502.4 |
| 5,950,381 A | * | 9/1999 | Stansbie | 52/220.8 |
| 6,088,876 A | * | 7/2000 | Daoud | 16/2.2 |

(Continued)

FOREIGN PATENT DOCUMENTS

| | | | | |
|---|---|---|---|---|
| EP | 076578 B1 | * | 3/1985 | H02G 3/22 |
| GB | 2451426 A | * | 2/2009 | H02G 3/22 |

OTHER PUBLICATIONS

Author Unknown: Title: Device for Insertion into a Metal Stud (Image); Date: Unknown.

*Primary Examiner* — Essama Omgba
(74) *Attorney, Agent, or Firm* — Eric Karich (57) ABSTRACT

A grommet has a faceplate with a width that is greater than an aperture width in a metal stud, as well as a front surface and a rear surface that extend downwardly to form a first clip portion. The grommet also includes a flange extending from a perimeter of an opening through the faceplate, to form a duct shaped to receive the flex tubing therethrough. A second clip portion extends downwardly from the flange, adjacent the first clip portion, so that the first and second clip portions frictionally engage the metal stud to hold the duct within the aperture of the metal stud.

4 Claims, 6 Drawing Sheets

(56) References Cited

U.S. PATENT DOCUMENTS

| | | | |
|---|---|---|---|
| 6,675,439 B2* | 1/2004 | Hashimoto | 16/2.1 |
| 6,901,627 B2* | 6/2005 | Uchida | 16/2.1 |
| 7,222,394 B2* | 5/2007 | Gardner | 16/2.1 |
| 7,930,800 B1* | 4/2011 | Castrale et al. | 16/2.2 |
| 7,963,498 B2* | 6/2011 | Seymour et al. | 248/604 |
| 8,701,246 B2* | 4/2014 | Allen | 16/2.1 |
| 2002/0038492 A1* | 4/2002 | Hashimoto | 16/2.1 |
| 2006/0200936 A1* | 9/2006 | Gardner | 16/2.1 |
| 2008/0067294 A1* | 3/2008 | Heller et al. | 248/56 |
| 2010/0139035 A1* | 6/2010 | Magennis et al. | 16/2.1 |

* cited by examiner

GROMMET

CROSS-REFERENCE TO RELATED APPLICATIONS

This application for a utility patent claims the benefit of U.S. Provisional Application No. 61/530,251, filed Sep. 1, 2011.

STATEMENT REGARDING FEDERALLY SPONSORED RESEARCH

Not Applicable

BACKGROUND OF THE INVENTION

1. Field of the Invention

This invention relates generally to a grommet, and more particularly to a grommet adapted to be inserted into metal studs to facilitate installation of flex tubing through the metal studs.

2. Description of Related Art

The following art defines the present state of this field:

Lynch, Jr. et al., U.S. Pat. No. 5,537,714, teaches a plastic grommet for use on metal studs in wall construction protecting wires, cabling, conduit, and the like. The grommet includes a cylindrical body having an enlarged flange on one end with radially projecting spring snaps on the exterior of the body whereby the grommet may be inserted in a sized hole in the web with the hole edge captured between the snaps and flange. On the other side of the flange are diametrically opposed axially projecting spring fingers. Two such grommets thus assembled on opposite sides of a hole in the stud web capture the web between the flanges.

Smigel et al., U.S. Pat. No. 5,626,316, teaches a plastic clip fastened to a metal or wood stud to support and position multiple runs of various types of wiring or cabling. The clip includes a base with a short gauge flange at one end to engage the face or front corner of the stud when the base is fastened to the side of the stud. Projecting directly from the base or a neck extension of the base are two spaced hinge arms, which extend at an angle to each other. Each arm includes two interior opening cable receiving slots. Between such slots is a bulbous thinner wall pressure body section which in its undistorted condition partly restricts the opening of such slots. A similar thinner wall section forms the interior or base side of the innermost slot in each arm. When wiring or cabling is inserted in the slots when the hinge arms are open it is moderately gripped by the clip so that it is not loose, thus reducing the weight and strain of the wiring or cabling at an electrical box or other termination.

The above-described references are hereby incorporated by reference in full.

SUMMARY OF THE INVENTION

The present invention teaches certain benefits in construction and use which give rise to the objectives described below.

The present invention provides a grommet for facilitating installation of flex tubing through an aperture in a metal stud. The grommet includes a faceplate with a width that is greater than a width of the aperture, as well as a front surface and a rear surface that extend downwardly to form a first clip portion. The grommet also includes a flange extending from a perimeter of an opening through the faceplate, to form a duct shaped to receive the flex tubing therethrough. A second clip portion extends downwardly from the flange, adjacent the first clip portion, so that the first and second clip portions frictionally engage the metal stud to hold the duct within the aperture of the metal stud.

A primary objective of the present invention is to provide a grommet having advantages not taught by the prior art.

Another objective is to provide a grommet that may be inserted into an aperture of a metal stud to facilitate installation and removal of flex tubing, wires, cabling, and the like.

Another objective is to provide a means for easily sliding flex tubing through metal studs, without straining or twisting the flex tubing.

A further objective is to provide a grommet that can be quickly and easily mounted into the aperture of the metal stud.

A further objective is to provide a grommet that can be quickly and easily locked onto the flex tubing, enabling the flex tubing to be secured to the metal stud without the use of ties and without requiring holes to be drilled through the metal stud for receiving the ties.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a grommet 10 for facilitating installation of flex tubing 12 through an aperture 14 in a metal stud 16.

Figure 1:
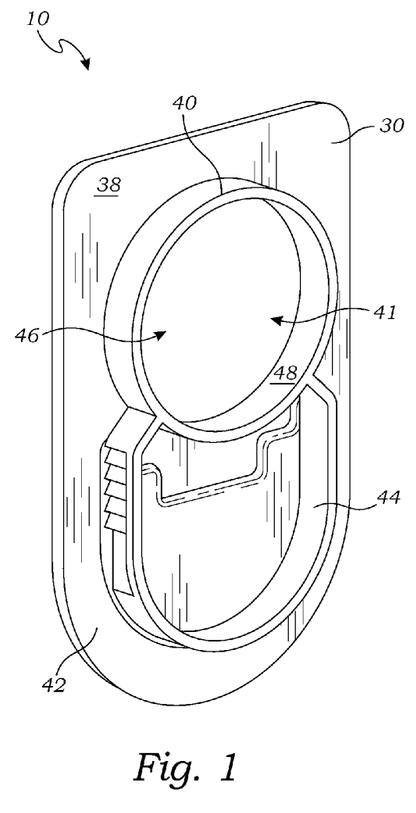
FIG. 1 is a rear perspective view of a grommet according to one embodiment of the present invention.
Figure 2:
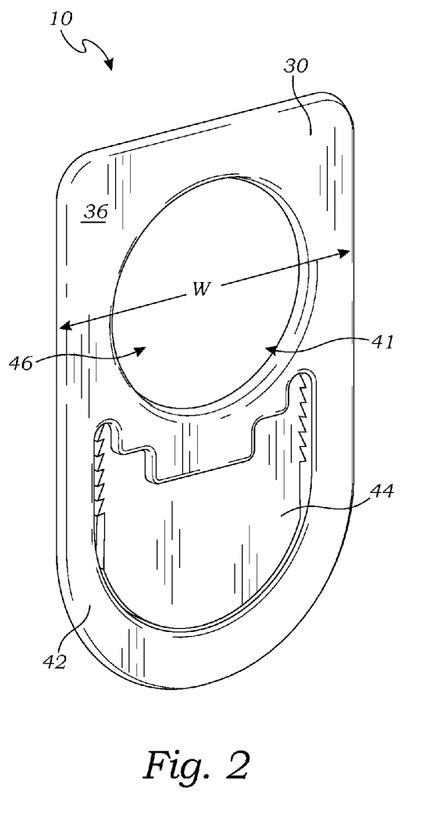
FIG. 2 is a front perspective view of the grommet.
Figure 3:
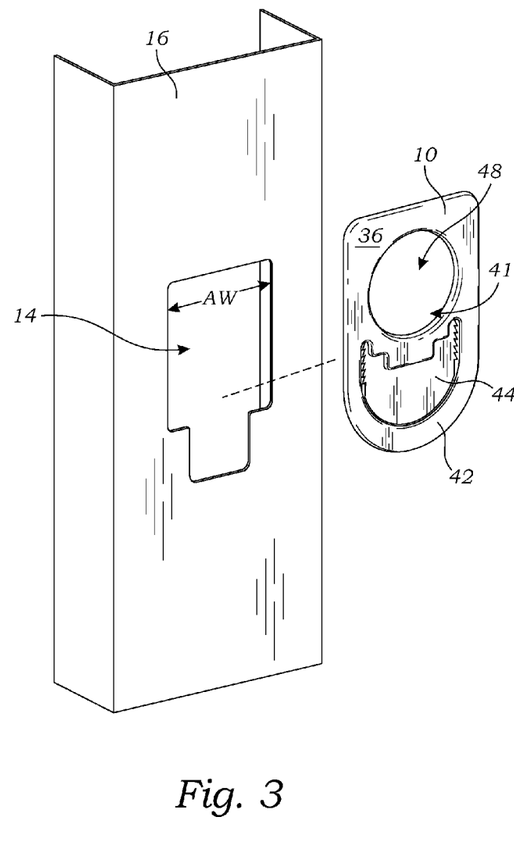
FIG. 3 is an exploded front perspective view of the grommet being inserted into an aperture of a metal stud.
Figure 4:
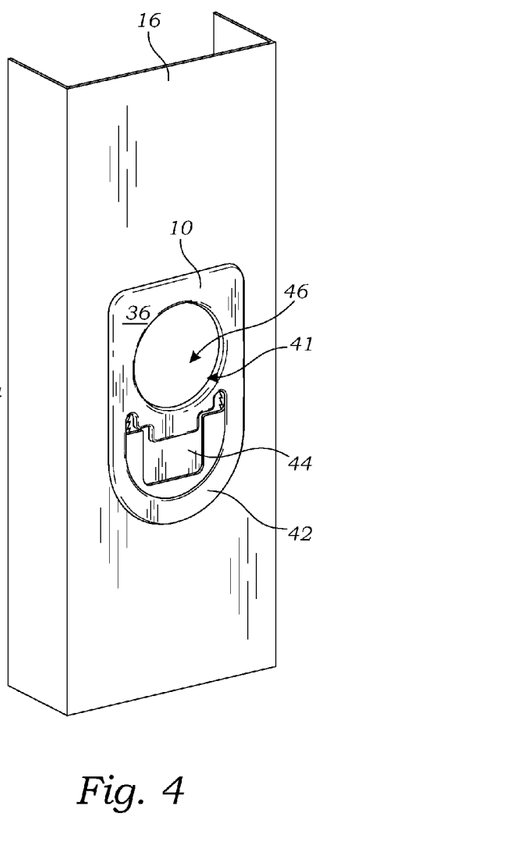
FIG. 4 is a front perspective of the grommet once it has been inserted into the aperture of the metal stud.

FIG. 1 is a rear perspective view of a grommet 10 according to one embodiment of the present invention. FIG. 2 is a front perspective view of the grommet 10. FIG. 3 is an exploded front perspective view of the grommet 10 being inserted into the aperture 14 of the metal stud 16. FIG. 4 is a front perspective of the grommet 10 once it has been inserted into the aperture 14 of the metal stud 16.

As shown in FIGS. 1-4, the grommet 10 may include a faceplate 30, a flange 40, a first clip portion 42, and a second clip portion 44. The faceplate 30 may have a width (W) that is greater than an aperture width (AW) of the aperture 14 of the metal stud 16, and may further include a front surface 36 and a rear surface 38. The faceplate 30 is adapted to abut the metal stud 16 for properly positioning the grommet 10 in the aperture 14. While the faceplate 30 is a generally planar construction in the present embodiment, alternative constructions may be used if they are functional for correctly positioning the grommet 10 in the aperture 14.

The flange 40 may extend from a perimeter of an opening 46 through the faceplate 30, to form a duct 41 through which flex tubing 12 may be inserted. Additionally, the flange 40 may have a smooth surface 48 in order to facilitate easy sliding of flex tubing 12 through the duct 41. For purposes of this application, the term flex tubing 12 is defined to include any form of conduits, wiring, cables, or other similar elements that may need to be pulled through the aperture 14 of the metal stud 16.

As illustrated in FIGS. 1-4, the first clip portion 42 and the second clip portion 44 extend downwardly from the grommet 10 for clipping the metal stud 16 and locking the grommet 10 in place within the aperture 14. In the present embodiment, the first clip portion 42 extends downwardly from the rear surface 38 of the faceplate 30 of the grommet 10. In the embodiment of FIGS. 1-4, the first clip portion 42 is generally U-shaped and may be used to clip the metal stud 16. As illustrated in FIGS. 1-4, the second clip portion 44 of the grommet 10 may extend downwardly from the flange 40, adjacent the first clip portion 42, so that the first and second clip portions 42 and 44 may frictionally engage the metal stud 16 to hold the duct 41 within the aperture 14 of the metal stud 16. Thus, the rear surface 38 of the faceplate 30 may abut the metal stud 16, while the duct 41 portion may be inserted into the metal stud 16 and held in place by the first and second clip portions 42 and 44, to serve as a conduit for the flex tubing 12. It should be noted, however, that while FIGS. 1-4 illustrate one embodiment of the first and second clip portions 42 and 44, alternative embodiments may be devised by one skilled in the art, and such alternative or equivalent embodiments should be considered within the scope of the present invention.

The duct 41 is shaped to prevent damage to the flex tubing 12 when pulled through the metal stud 16. The grommet 10 is also generally shaped to protect the user's hands while pulling the flex tubing 12 through the metal stud 16.

Figure 5:
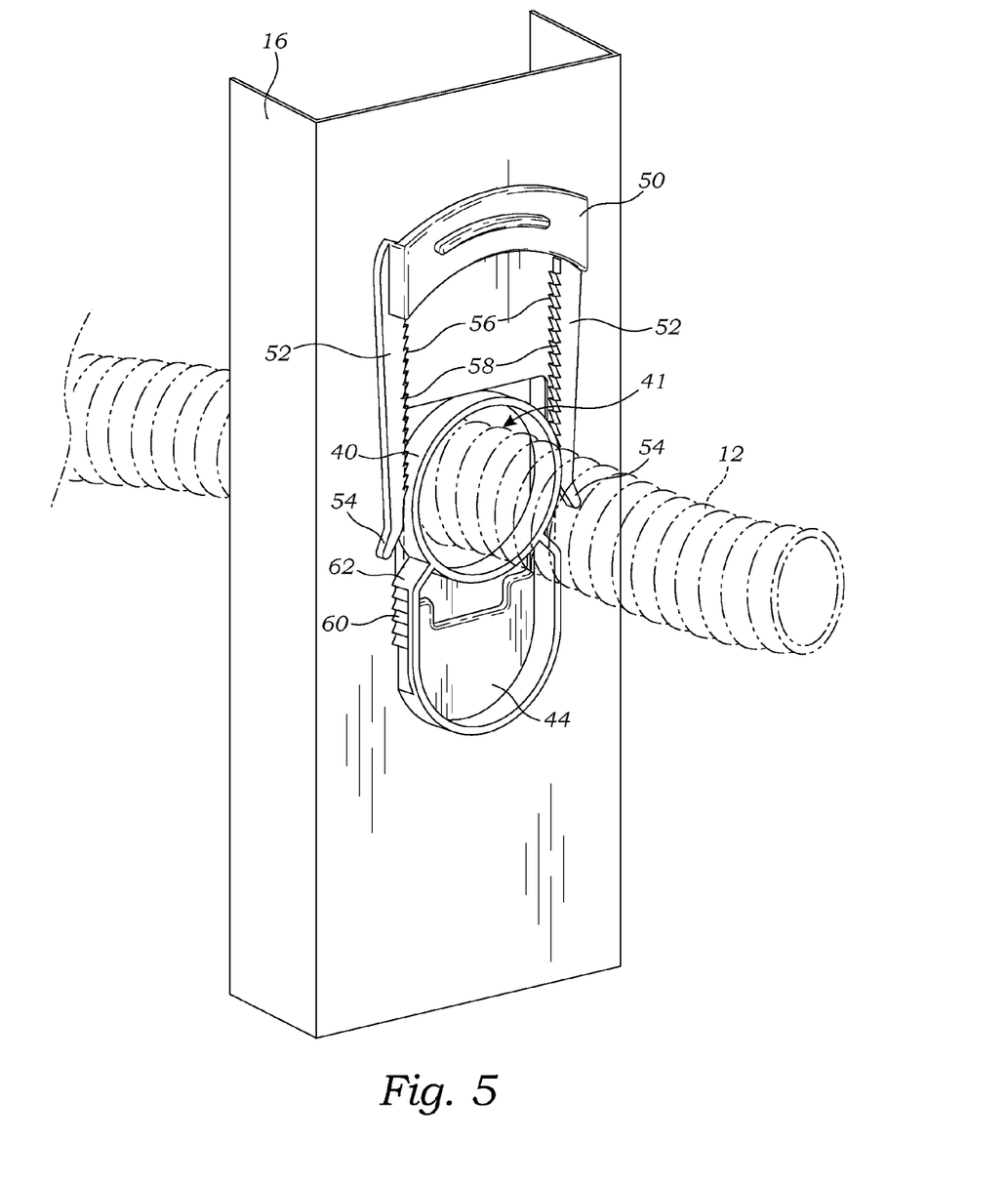
FIG. 5 is a rear perspective view of the grommet once it has been inserted into the aperture of the metal stud, with flex tubing inserted through a duct in the grommet, the view illustrating a locking bar being positioned on the grommet in an unlocked position.
Figure 6:
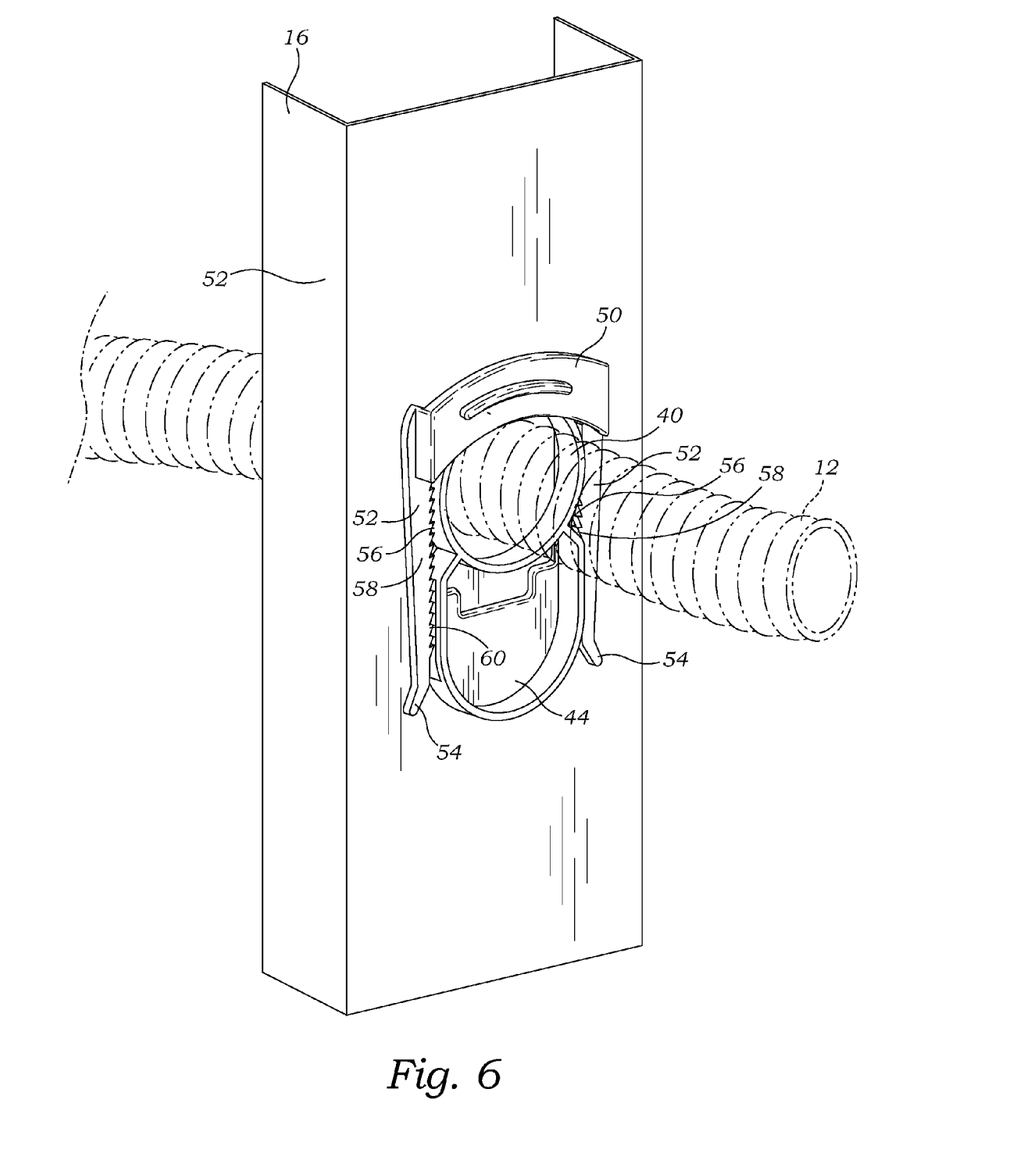
FIG. 6 is a rear perspective view of the grommet inserted into the metal stud, illustrating the locking bar in a locked position to lock the flex tubing to the metal stud.
Figure 7:
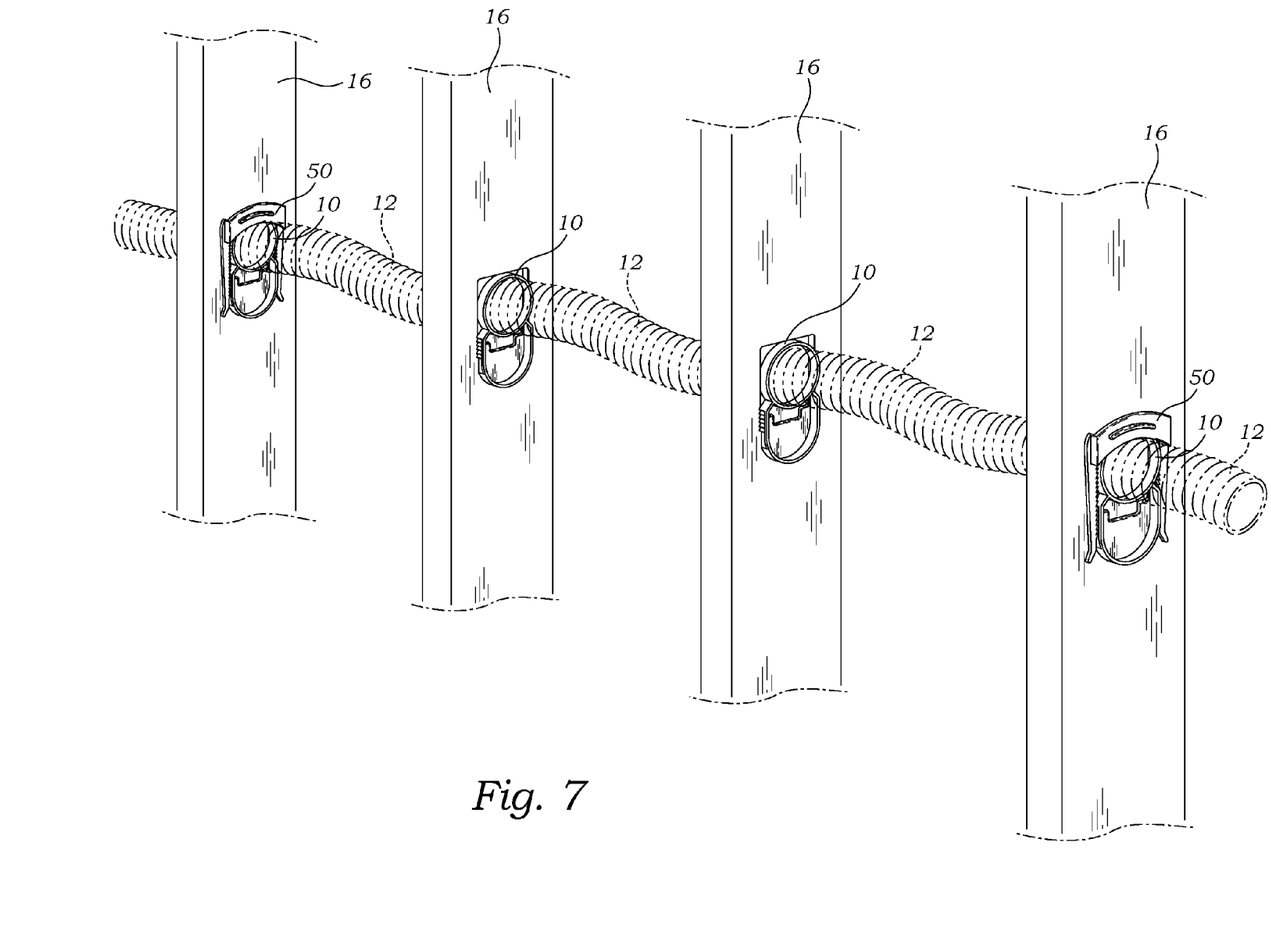
FIG. 7 is a perspective view of a plurality of the grommets inserted into apertures of a plurality of the metal studs, with flex tubing inserted through the grommets such that it extends through all of the metal studs.

FIG. 5 is a rear perspective view of the grommet 10 once it has been inserted into the aperture 14 of the metal stud 16, illustrating the flex tubing 12 once it has been inserted through the duct 41 in the grommet 10, the view illustrating a locking bar 50 being positioned on the grommet 10 in an unlocked position. FIG. 6 is a rear perspective view of the grommet 10 inserted into the metal stud 16, illustrating the locking bar 50 in a locked position to lock the flex tubing 12 to the metal stud 16. FIG. 7 is a perspective view of a plurality of the grommets 10 inserted into apertures 14 of a plurality of the metal studs 16, with flex tubing 12 inserted through the grommets 10 such that it extends through all of the metal studs 16.

As FIGS. 5-7 illustrate, the locking bar 50 is adapted to prevent the flex tubing 12 from moving with respect to the metal stud 16. In the present embodiment, the locking bar 50 includes a pair of legs 52 extending from the locking bar 50 for operatively engaging the grommet 10 and locking against the flex tubing 12.

In the unlocked position, illustrated in FIG. 5, the pair of legs 52 extend downwardly from the locking bar 50 to operatively engage first and second interlocking features 56 and 60 of the grommet 10. In such a position, the locking bar 50 does not obstruct the duct 41 and the flex tubing 12 may freely move through the metal stud 16.

Once the locking bar 50 has been moved to the locked position, illustrated in FIG. 6, the locking bar 50 abuts and locks against the flex tubing 12. Thus, while in the locked position, the locking bar 50 clamps down upon the flex tubing 12 to lock it within the duct 41. As a result, the flex tubing 12 may be secured in position within the metal stud 16.

In the embodiment of FIGS. 5-7, the pair of legs 52 may extend downwardly from the locking bar 50, before terminating in a pair of ends 54 that curve outwardly in opposite directions. Additionally, the first interlocking features 56 on each of the pair of legs 52 may include ridges on an inner surface 58 of each of the pair of legs 52. As previously mentioned, these first interlocking features 56 may operatively engage with the second interlocking features 60 of the grommet 10, in order to lock the locking bar 50 in the locked position. The second interlocking features 60 may also include ridges on an outer surface 62 of the grommet 10, which may then interconnect with the corresponding first interlocking features 56 on the pair of legs 52. In one embodiment, these ridges may be ratchet pawls or a similar interlocking feature that enables easy movement in one direction (towards the locked position), but prevents movement in the reverse direction; however, alternative embodiments of the interlocking features may be utilized according to the design of one skilled in the art. For example, one of the pair of legs 52 may be fixedly attached, while the other is movably engaged such as is described herein.

In operation, the present invention facilitates the installation of flex tubing 12 through the apertures 14 of metal studs 16. The grommet 10 may be inserted in the aperture 14 of the metal stud 16 so that the faceplate 30 abuts the metal stud 16, and such that the first and second clip portions 42 and 44 are positioned on either side of the metal stud 16. The grommet 10 saves significant time and effort during the installation of the flex tubing 12 because a large number of the grommets 10 may be quickly and easily slipped into place, and then the flex tubing 12 may then easily pulled into position, without the significant difficulties experienced in the flex tubing 12 snagging on the metal studs 16.

The flange 40 extending from the opening 46 through the faceplate 30 forms the duct 41 through which the flex tubing 12 may be inserted and pulled through with ease, eliminating the difficult struggle of forcing the flex tubing 12 through the naked metal studs 16. After the desired length of flex tubing 12 has been pulled through the grommet 10, the locking bar is locked into place via the pair of legs 52. Once the locking bar 50 has been moved to the locked position against the flex tubing 12, the flex tubing 12 is secured to the metal stud 16 and held in position by the locking bar 50, thereby avoiding the need to secure the flex tubing 12 into place with wires or other additional fasteners.

Figure 8:
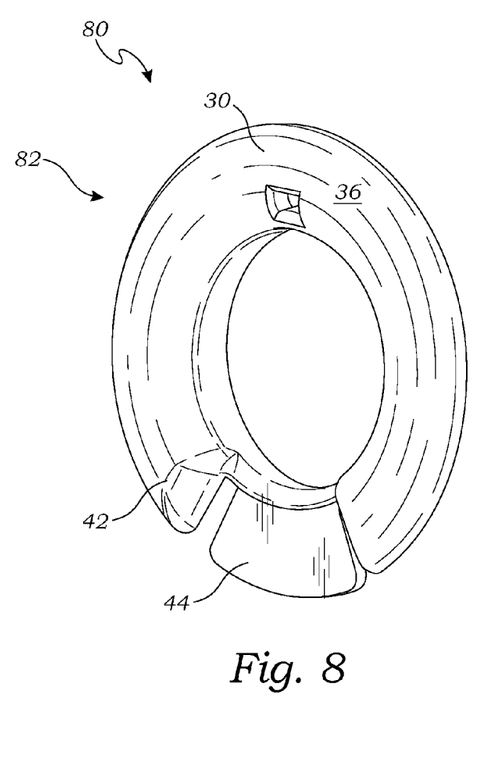
FIG. 8 is a front perspective view of an alternative embodiment of the grommet.

FIG. 8 is a front perspective view of an alternative embodiment of a grommet 80.

Figure 9:
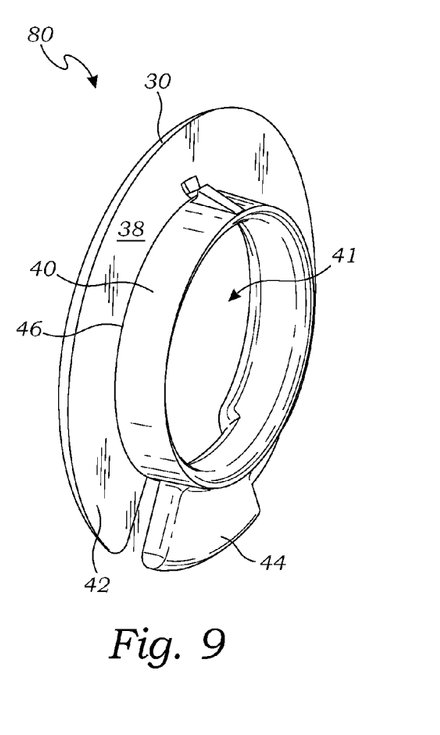
FIG. 9 is a rear perspective view of the alternative embodiment of the grommet.

FIG. 9 is a rear perspective view of the alternative embodiment of the grommet 80. As illustrated in FIGS. 8 and 9, the alternative embodiment of the grommet 80 may include a faceplate 30 that is formed in an annular shape 82. Much like the embodiment of the grommet 10 illustrated in FIGS. 1-7, the rear surface 38 may be pushed up against the metal stud 16 such that the duct 41 may be inserted through the aperture 14 of the metal stud 16. The first and second clip portions 42 and 44 may then hold the duct 41 in place during and after the installation of the flex tubing 12. While FIGS. 8 and 9 illustrate one alternative embodiment of the grommet 80, the grommet 80 may vary in shape and size, and one skilled in the art may devise other suitable alternative embodiments that are within the scope of the present invention.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A grommet for facilitating installation of flex tubing through an aperture in a metal stud, the aperture having an aperture width, the grommet comprising:
   a faceplate having a width that is greater than the aperture width, the faceplate having a front surface and a rear surface that extend downwardly to form a first clip portion;
   a flange extending from a perimeter of an opening through the faceplate forming a duct shaped to receive the flex tubing therethrough;
   a second clip portion extending downwardly from the flange, adjacent the first clip portion, so that the first and second clip portions frictionally engage the metal stud to hold the duct within the aperture of the metal stud;
   a locking bar operatively engaged with the grommet for moving from an unlocked position in which the locking bar does not obstruct the duct, to a locked position in which the locking bar clamps down upon the flex tubing to lock it within the duct;
   a pair of legs extending downwardly from the locking bar, each of the pair of legs having first interlocking features; and
   second interlocking features of the grommet for operatively engaging with the first interlocking features for locking the locking bar in the locked position.

2. The grommet of claim 1, wherein:
   the first interlocking features include ridges on an inner surface of each of the pair of legs; and
   wherein the second interlocking features include ridges on an outer surface of the grommet.

3. A grommet for facilitating installation of flex tubing through an aperture in a metal stud, the grommet comprising:
   a duct shaped to fit within the aperture of the metal stud, and to receive the flex tubing therethrough, the duct being shaped to enable smooth movement of the flex tubing therethrough;
   a first clip portion extending from the duct;
   a second clip portion extending from the duct, adjacent the first clip portion, so that the first and second clip portions frictionally engage the metal stud to hold the duct within the aperture of the metal stud;
   a locking bar operatively engaged with the grommet for moving from an unlocked position in which the locking bar does not obstruct the duct, to a locked position in which the locking bar clamps down upon the flex tubing to lock it within the duct;
   a pair of legs extending downwardly from the locking bar, each of the pair of legs having first interlocking features; and
   second interlocking features of the grommet for operatively engaging with the first interlocking features for locking the locking bar in the locked position.

4. The grommet of claim 3, wherein:
   the first interlocking features include ridges on an inner surface of each of the pair of legs; and
   wherein the second interlocking features include ridges on an outer surface of the grommet.

\* \* \* \* \*